United States Patent
White et al.

(10) Patent No.: US 10,397,241 B2
(45) Date of Patent: Aug. 27, 2019

(54) SYSTEMS AND METHODS FOR INTEGRATION OF DIRECTORY SERVICE WITH MANAGEMENT CONTROLLERS

(71) Applicant: Dell Products L.P., Round Rock, TX (US)

(72) Inventors: William C. White, Round Rock, TX (US); Hung T. Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 16 days.

(21) Appl. No.: 15/287,109

(22) Filed: Oct. 6, 2016

(65) Prior Publication Data

US 2018/0103062 A1 Apr. 12, 2018

(51) Int. Cl.
*H04L 29/06* (2006.01)
*H04L 29/08* (2006.01)
*G06F 21/60* (2013.01)
*G06F 21/62* (2013.01)

(52) U.S. Cl.
CPC ............ *H04L 63/105* (2013.01); *G06F 21/60* (2013.01); *G06F 21/6218* (2013.01); *H04L 63/104* (2013.01); *H04L 67/1097* (2013.01)

(58) Field of Classification Search
CPC ..... H04L 63/20; H04L 63/101; H04L 63/102; H04L 63/104; H04L 63/105
See application file for complete search history.

(56) References Cited

U.S. PATENT DOCUMENTS

| | | | |
|---|---|---|---|
| 2006/0236380 A1* | 10/2006 | Bransom | G06F 21/6218 726/6 |
| 2009/0133040 A1* | 5/2009 | Stevens, IV | G06F 1/3209 719/315 |
| 2013/0265328 A1* | 10/2013 | Lambert | G06F 11/321 345/629 |

* cited by examiner

*Primary Examiner* — Ayoub Alata
(74) *Attorney, Agent, or Firm* — Jackson Walker L.L.P.

(57) ABSTRACT

In accordance with embodiments of the present disclosure, an information handling system may include a processor, a directory service application comprising a program of instructions embodied in computer-readable media accessible to the processor, the directory service application configured to enumerate a plurality of management controller categories for management controllers of a plurality of information handling systems communicatively coupled to one another via a network and create a directory service device object for each of the plurality of management controller categories.

12 Claims, 4 Drawing Sheets

_US 10,397,241 B2_

SYSTEMS AND METHODS FOR INTEGRATION OF DIRECTORY SERVICE WITH MANAGEMENT CONTROLLERS

TECHNICAL FIELD

The present disclosure relates in general to information handling systems, and more particularly to integration of a directory service such as Windows Active Directory (AD) with Management Controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Networked information handling systems often use directory services, such as Windows Active Directory (AD). A directory service, sometimes also known as name service, maps the names of network resources to their respective network addresses. Using a directory service, a user does not have to remember the physical address of a network resource; providing a name locates the resource. A directory server is a server which provides directory service. Typically, each resource on a network is considered an object on the directory server. Information about a particular resource may be stored as attributes of that object. In some directory services, information within objects can be made secure so that only users with the available permissions can access it.

In addition, information handling systems may often include host management controllers (HMCs) and chassis management controllers (CMCs). A host management controller may include a system integral to an information handling system which is configured to provide out-of-band management facilities for management of an information handling system. A chassis management controller may include a system integral to a chassis housing a plurality of modular information handling systems which is configured to provide chassis-level management of a chassis.

Using traditional approaches, a directory service typically creates a device object for each host management controller and chassis management controller within a network. In order to support various access privileges, each such device object is also typically associated with one or more association objects, each of which associates the device object to users/user groups with access to the device object as well as a privilege object defining the access level of such users/user groups to the device object.

Under such approaches, the number of device objects may become remarkably large as an organization adds host management controllers and chassis management controllers to its enterprise network, as a device object is created for each new management controller. Accordingly, in large organizations, a special organizational unit (OU) must often be created solely for management of management controllers. Further, a directory service object creation privilege must be delegated to a special service account or group for such organization unit so that such special service account or group can manage dynamic device creation under such organizational unit. In addition, as information handling systems are decommissioned, their associated management controller device objects must all be destroyed. Thus, management of directory service device objects comes with a high degree of management complexity and cost.

SUMMARY

In accordance with the teachings of the present disclosure, certain disadvantages and problems associated with integration of a directory service with management controllers have been reduced or eliminated.

In accordance with embodiments of the present disclosure, an information handling system may include a processor, a directory service application comprising a program of instructions embodied in computer-readable media accessible to the processor, the directory service application configured to enumerate a plurality of management controller categories for management controllers of a plurality of information handling systems communicatively coupled to one another via a network and create a directory service device object for each of the plurality of management controller categories.

In accordance with these and other embodiments of the present disclosure, a method may include enumerating a plurality of management controller categories for management controllers of a plurality of information handling systems communicatively coupled to one another via a network and creating a directory service device object for each of the plurality of management controller categories.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to enumerate a plurality of management controller categories for management controllers of a plurality of information handling systems communicatively coupled to one another via a network and create a directory service device object for each of the plurality of management controller categories.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4D, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various I/O devices, such as a keyboard, a mouse, and a video display. The information handling system may also include one or more busses operable to transmit communication between the various hardware components.

For the purposes of this disclosure, information handling resources may broadly refer to any component system, device or apparatus of an information handling system, including without limitation processors, buses, memories, I/O devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Figure 1:
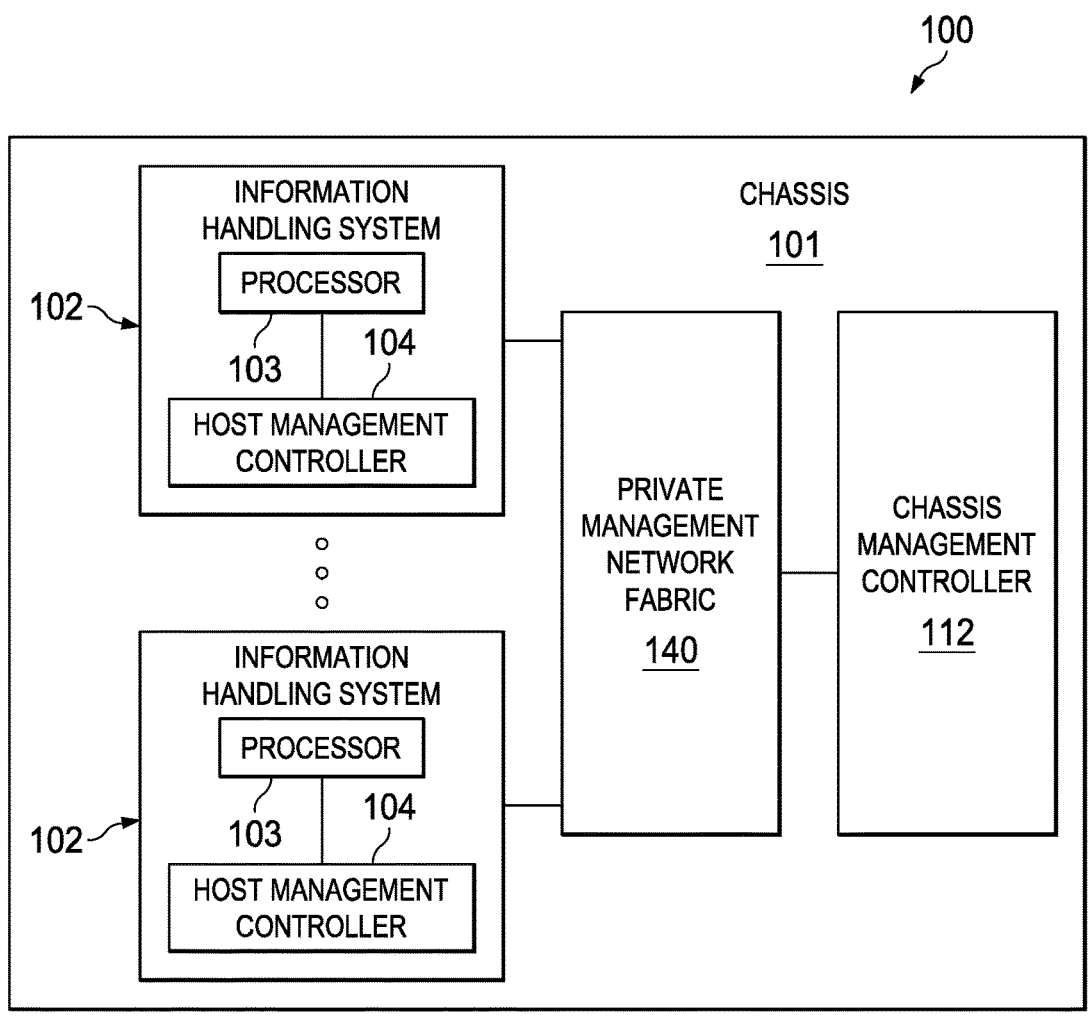
FIG. 1 illustrates a block diagram of an example system chassis with multiple modular information handling systems disposed therein, in accordance with embodiments of the present disclosure.

FIG. 1 illustrates a block diagram of an example system 100 comprising a chassis 101 with multiple modular information handling systems 102 disposed therein, in accordance with embodiments of the present disclosure. As depicted in FIG. 1, system 100 may comprise a chassis 101 including a plurality of information handling systems 102, a private management network fabric 140, and a chassis management controller 112. In addition to information handling systems 102, private network management fabric 140, and chassis management controller 112, chassis 101 may include one or more other information handling resources.

An information handling system 102 may generally be operable to receive data from and/or communicate data to one or more information handling resources of chassis 101, including communicating with chassis management controller 112 via private management network fabric 140. In certain embodiments, an information handling system 102 may be a server. In such embodiments, an information handling system may comprise a blade server having modular physical design. In these and other embodiments, an information handling system 102 may comprise an M class server. As depicted in FIG. 1, an information handling system 102 may include a processor 103 and a host management controller 104. In addition to processor 103 and host management controller 104, information handling system 102 may include one or more other information handling resources.

A processor 103 may include any system, device, or apparatus configured to interpret and/or execute program instructions and/or process data, and may include, without limitation, a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory or other computer-readable media accessible to processor 103.

Information handling system 102 may include a host management controller 104. Host management controller 104 may be implemented by, for example, a microprocessor, microcontroller, DSP, ASIC, EEPROM, or any combination thereof. Host management controller 104 may be configured to communicate with chassis management controller 112. Such communication may be made, for example, via private management network fabric 140. Host management controller 104 may be configured to provide out-of-band management facilities for management of information handling system 102. Such management may be made by information handling resources of chassis 101 even if information handling system 102 is powered off or powered to a standby state. Host management controller 104 may include a processor, memory, and network connection separate from the rest of information handling system 102. In certain embodiments, host management controller 104 may include or may be an integral part of a baseboard management controller (BMC), Dell Remote Access Controller (DRAC) or an Integrated Dell Remote Access Controller (iDRAC).

Chassis management controller 112 may comprise any system, device, or apparatus configured to facilitate management and/or control of system 100 embodied by chassis 101, its information handling systems 102, and/or one or more of its component information handling resources. Chassis management controller 112 may be configured to issue commands and/or other signals to manage and/or control an information handling system 102 and/or information handling resources of system 100. Chassis management controller 112 may comprise a microprocessor, microcontroller, DSP, ASIC, field programmable gate array ("FPGA"), EEPROM, or any combination thereof. In some embodiments, chassis management controller 112 may provide a management console for user/administrator access to these functions. For example, chassis management controller 112 may implement Web Services Management ("WS-MAN") or another suitable management protocol permitting a user to remotely access chassis management controller 112 to configure system 100 and its various information handling resources. In such embodiments, chassis management controller 112 may interface with a network interface, thus allowing for "out-of-band" control of system 100, such that communications to and from chassis management controller 112 are communicated via a management channel physically isolated from an "in-band" communication channel of chassis 101 for which non-management communication may take place. Thus, for example, if a failure occurs in system 100 that prevents an administrator from interfacing with system 100 via the in-band communication channel or a user interface associated with chassis 101 (e.g., power failure, etc.), the administrator may still be able to monitor and/or manage system 100 (e.g., to diagnose problems that may have caused failure) via chassis management controller 112. In the same or alternative embodiments, chassis management controller 112 may allow an administrator to remotely manage one or more parameters associated with operation of system 100 and its various information handling resources (e.g., power usage, processor allocation, memory allocation, security privileges, etc.).

Private management network fabric 140 may comprise a network and/or fabric configured to couple information handling systems 102 (e.g., via host management controller 104) and chassis management controller 112 to each other and/or one or more other information handling resources of chassis 101. In these and other embodiments, private management network fabric 140 may include a communication infrastructure, which provides physical connections, and a management layer, which organizes the physical connections and information handling resources communicatively coupled to private management network fabric 140. Private management network fabric 140 may be implemented as, or may be a part of, an Ethernet local area network (LAN) or any other appropriate architecture or system that facilitates the communication of signals, data, and/or messages.

Figure 2:
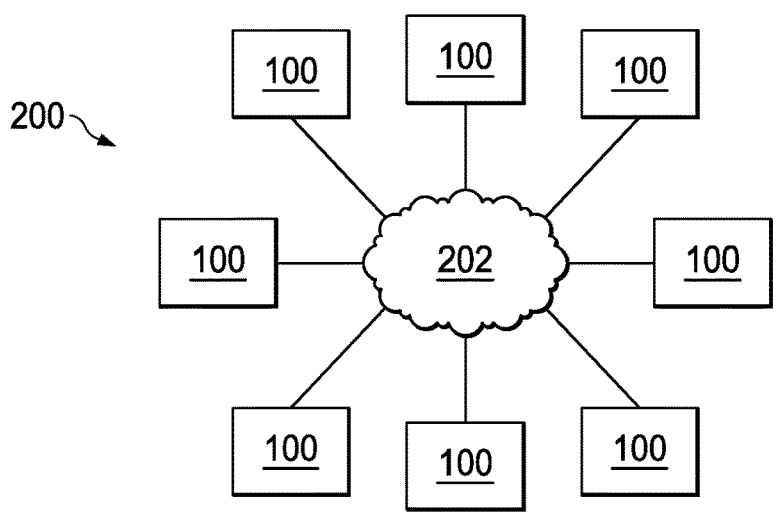
FIG. 2 illustrates a block diagram of a networked system having multiple chassis comprising information handling systems communicatively coupled to one another, in accordance with embodiments of the present disclosure.

FIG. 2 illustrates a block diagram of networked system 200 having multiple chassis systems 100 comprising information handling systems 102 communicatively coupled to one another via a network 202, in accordance with embodiments of the present disclosure. Network 202 may be a network and/or fabric configured to couple information handling systems 102 to one another. In these and other embodiments, network 202 may include a communication infrastructure, which provides physical connections, and a management layer, which organizes the physical connections and information handling systems communicatively coupled to network 202. Network 202 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 202 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 202 and its various components may be implemented using hardware, software, or any combination thereof.

Figure 3:
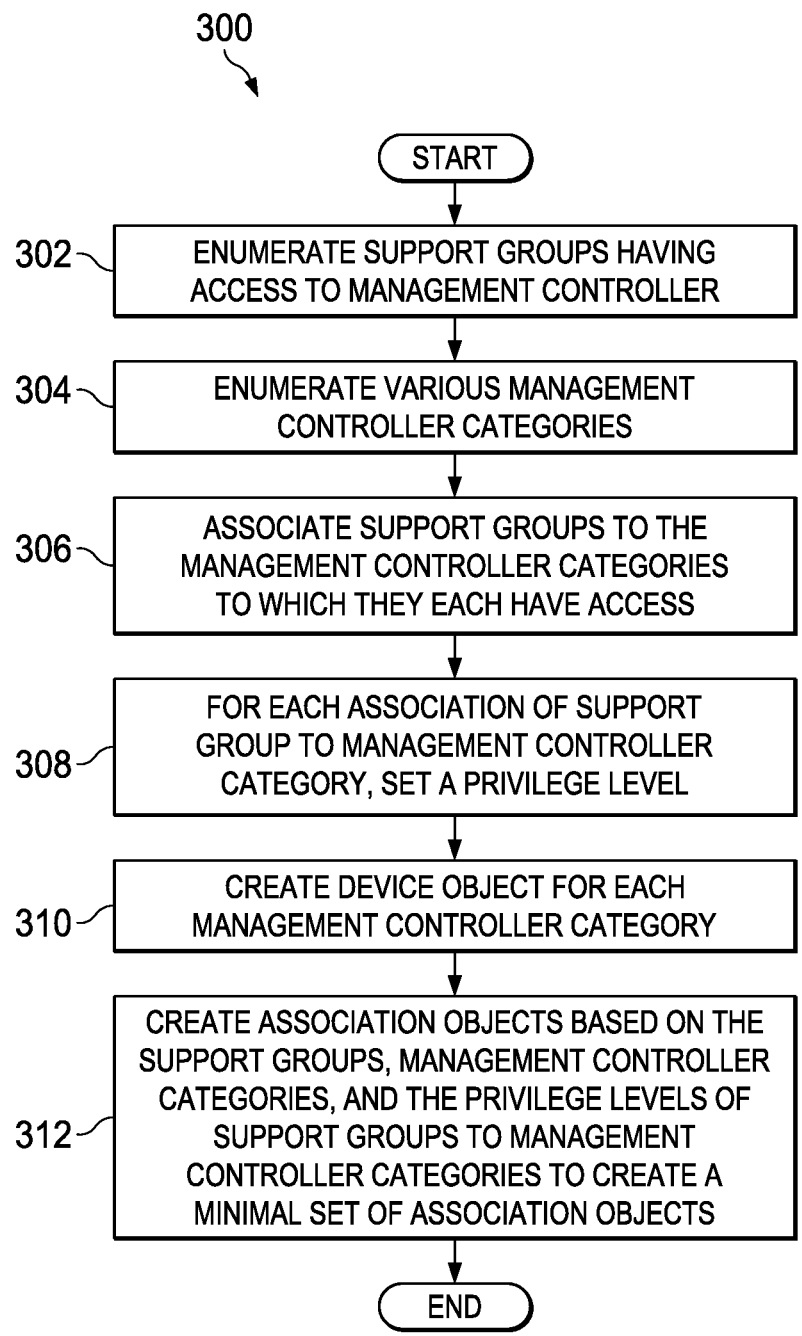
FIG. 3 illustrates a flow chart of an example method for integration of a directory service with management controllers, in accordance with embodiments of the present disclosure.

FIG. 3 illustrates a flow chart of an example method 300 for integration of a directory service with management controllers, in accordance with embodiments of the present disclosure. According to some embodiments, method 300 may begin at step 302. As noted above, teachings of the present disclosure may be implemented in a variety of configurations of system 100 and network system 200. As such, the preferred initialization point for method 300 and the order of the steps comprising method 300 may depend on the implementation chosen.

Figure 4A:
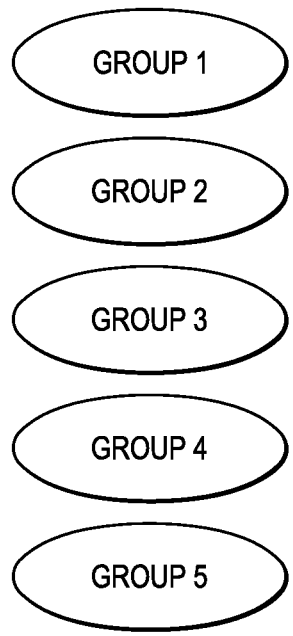
FIGS. 4A-4D graphically depict various steps of the method shown in FIG. 3, in accordance with embodiments of the present disclosure.
Figure 4B:
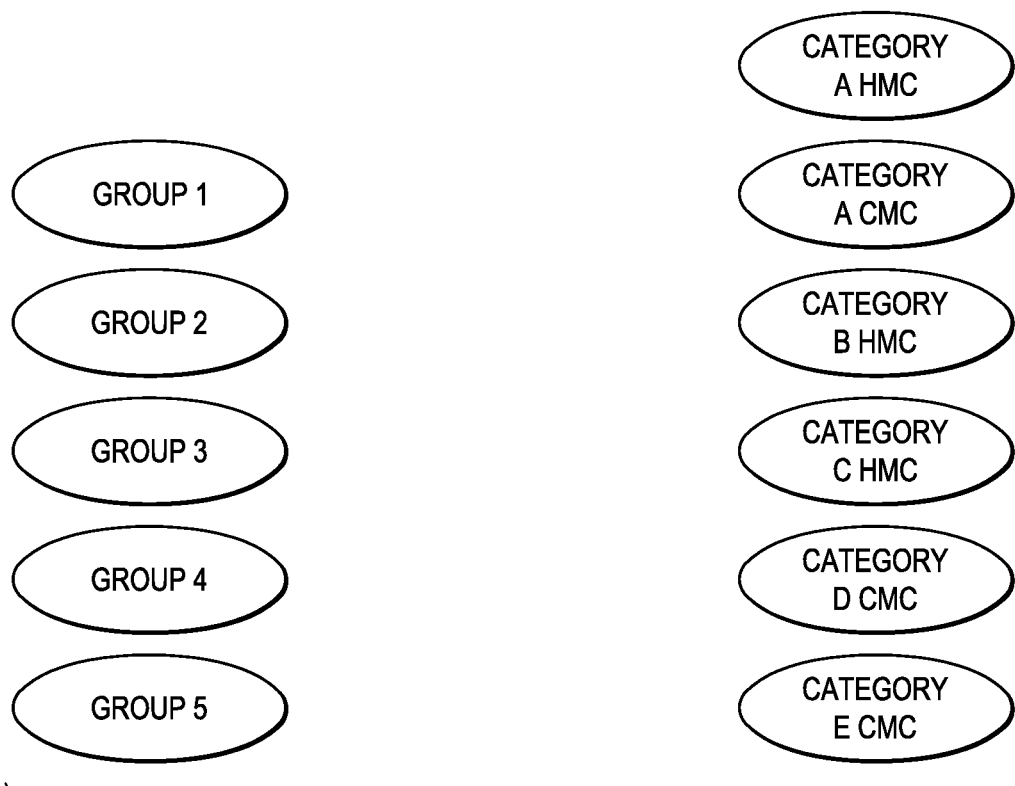

At step 302, a directory service application executing on one or more of information handling systems 102 may enumerate the various support groups (e.g., Groups 1, 2, 3, 4, and 5 shown in FIG. 4A) which may have access to host management controllers 104 and chassis management controllers 112 of networked system 200. At step 304, the directory service application may enumerate various management controller categories (e.g., Category A HMC, Category A CMC, Category B HMC, Category C HMC, Category D CMC, and Category E CMC as shown in FIG. 4B, wherein "HMC" is an abbreviation for "host management controller" and "CMC is an abbreviation for "chassis management controller").

Figure 4C:
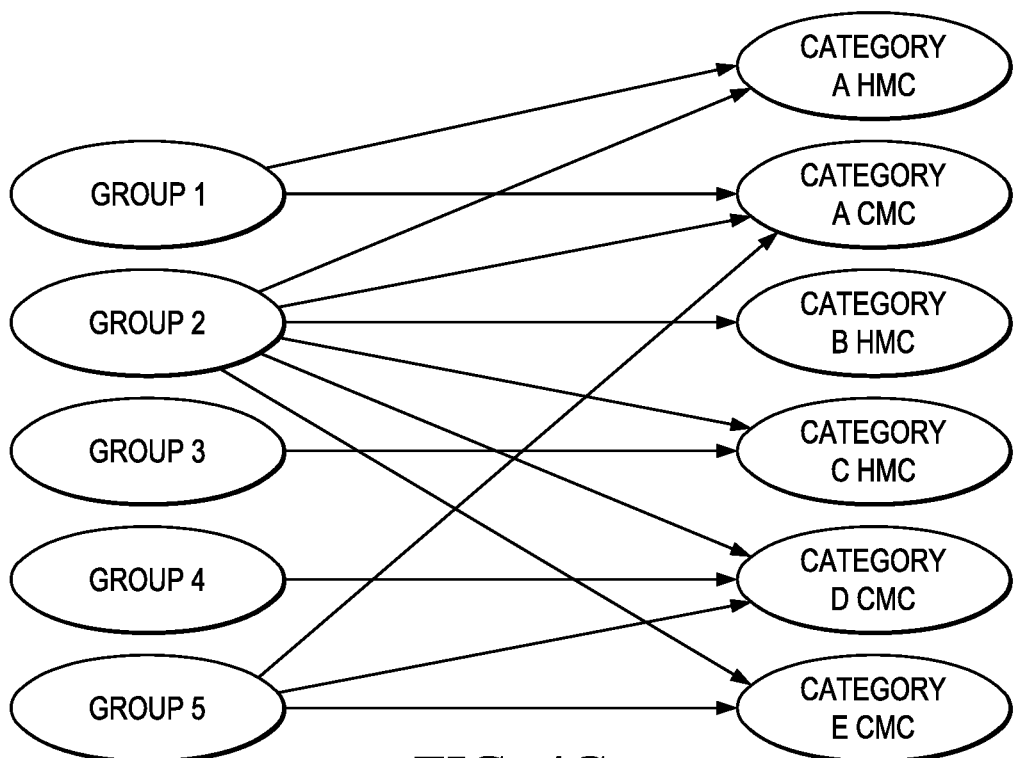
Figure 4D:
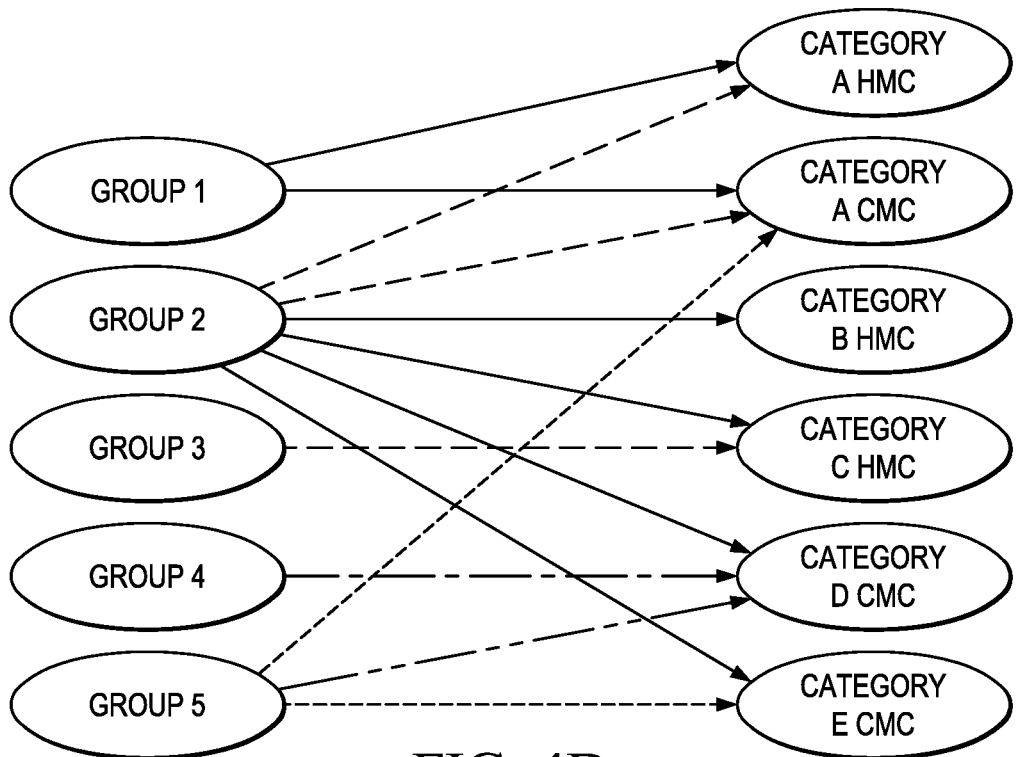

At step 306, the directory service application may associate the various support groups to the management controller categories to which they each have access (e.g., as depicted by the arrows in FIG. 4C). At step 308, the directory service application may, for each association of support group to management controller category, set a privilege level (e.g., full access, read-only access, etc.) defining the level of privilege by a support group to each management controller category to which it has access (e.g., as depicted by the arrows in FIG. 4D wherein each type of dashing and dotting of the arrows in FIG. 4D represents a different level of privilege). Thus, each different level of privilege may equate to a privilege object that may be used in an association object for a device object.

At step 310, the directory service application may create a device object for each management controller category (e.g., as opposed to creating a device object for each management controller as is done with traditional approaches). At step 312, the directory service application may create association objects based on the support groups, management controller categories, and the privilege levels of support groups to management controller categories in order to create a minimal set of association objects. For example, an association object may be created for each unique instance of support group and privilege level, with the exception that different association objects are created for different types of management controllers (e.g., a host management controller and chassis management controller cannot be part of the same association object). For example, for Group 2 shown in FIG. 4D, four association objects may be created, one for a first privilege level shown to Category A host management controllers, one for the first privilege level shown to Category A chassis management controllers, one for a second privilege level to each of Category B and Category C host management controllers, and one for the second privilege level to each of Category D and Category E chassis management controllers.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using system 100, network system 200, and/or any other system operable to implement method 300. In certain embodiments, method 300 may be implemented partially or fully in software and/or firmware embodied in computer-readable media. As a specific example, method 300 may be performed by a directory service application executing on one or more of information handling systems 102.

Under the methods and systems discussed herein, only one device object per category of management controller need be created, instead of one device object per physical management controller. Accordingly, a given device object may be pointed to multiple management controllers in such category. Advantageously, such approach greatly reduces the number of device objects created in a directory service for networked devices. Further, an optimization may further be applied to minimize the number of total association objects that need be created by a directory service. With a significantly smaller number of objects, such objects may be pre-created ahead of deployment, which may create improved security and simpler auditing of device permissions.

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
   a hardware processor;
   a directory service application comprising a program of instructions embodied in non-transitory, computer-readable media accessible to the hardware processor, the directory service application configured to:
      enumerate a plurality of management controller categories for management controllers configured to provide out-of-band management of a plurality of information handling systems communicatively coupled to one another via a network, wherein the management controller categories specify different types of management controllers, and wherein at least one of the plurality of management controller categories includes a plurality of the management controllers; and
      create a directory service device object for each of the plurality of management controller categories;
      wherein the directory service application is configured not to create directory service device objects for individual ones of the management controllers.

2. The information handling system of claim 1, the directory service application further configured to:
   enumerate a plurality of support groups each having access to the management controller categories;
   associate each of the plurality of support groups to the management controller categories to which they each have access;
   for each association of support group to category, set a privilege level defining a level of access privilege by the support group to each management controller category to which it has access; and
   create association objects for the directory service device objects based on enumeration of the support groups, categories, and the privilege levels in order to create a minimal set of association objects.

3. The information handling system of claim 1, wherein the management controllers comprise at least one host management controller.

4. The information handling system of claim 1, wherein the management controllers comprise at least one chassis management controller.

5. A method comprising:
   enumerating a plurality of management controller categories for management controllers configured to provide out-of-band management of a plurality of information handling systems communicatively coupled to one another via a network, wherein the management controller categories specify different types of management controllers, and wherein at least one of the plurality of management controller categories includes a plurality of the management controllers;
   creating a directory service device object for each of the plurality of management controller categories; and
   not creating directory service device objects for individual ones of the management controllers.

6. The method of claim 5, further comprising:
   enumerating a plurality of support groups each having access to the management controller categories;
   associating each of the plurality of support groups to the management controller categories to which they each have access;
   for each association of support group to category, setting a privilege level defining a level of access privilege by the support group to each management controller category to which it has access; and
   creating association objects for the directory service device objects based on enumeration of the support groups, categories, and the privilege levels in order to create a minimal set of association objects.

7. The method of claim 5, wherein the management controllers comprise at least one host management controller.

8. The method of claim 5, wherein the management controllers comprise at least one chassis management controller.

9. An article of manufacture comprising:
   a non-transitory computer readable medium; and
   computer-executable instructions carried on the computer readable medium, the instructions readable by a processor, the instructions, when read and executed, for causing the processor to:
      enumerate a plurality of management controller categories for management controllers configured to provide out-of-band management of a plurality of information handling systems communicatively coupled to one another via a network, wherein the management controller categories specify different types of management controllers, and wherein at least one of the plurality of management controller categories includes a plurality of the management controllers;

create a directory service device object for each of the plurality of management controller categories; and not creating directory service device objects for individual ones of the management controllers.

10. The article of claim 9, the instructions for further causing the processor to:

enumerate a plurality of support groups each having access to the management controller categories;

associate each of the plurality of support groups to the management controller categories to which they each have access;

for each association of support group to category, set a privilege level defining a level of access privilege by the support group to each management controller category to which it has access; and create association objects for the directory service device objects based on enumeration of the support groups, categories, and the privilege levels in order to create a minimal set of association objects.

11. The article of claim 9, wherein the management controllers comprise at least one host management controller.

12. The article of claim 9, wherein the management controllers comprise at least one chassis management controller.

* * * * *